Patented Jan. 7, 1941

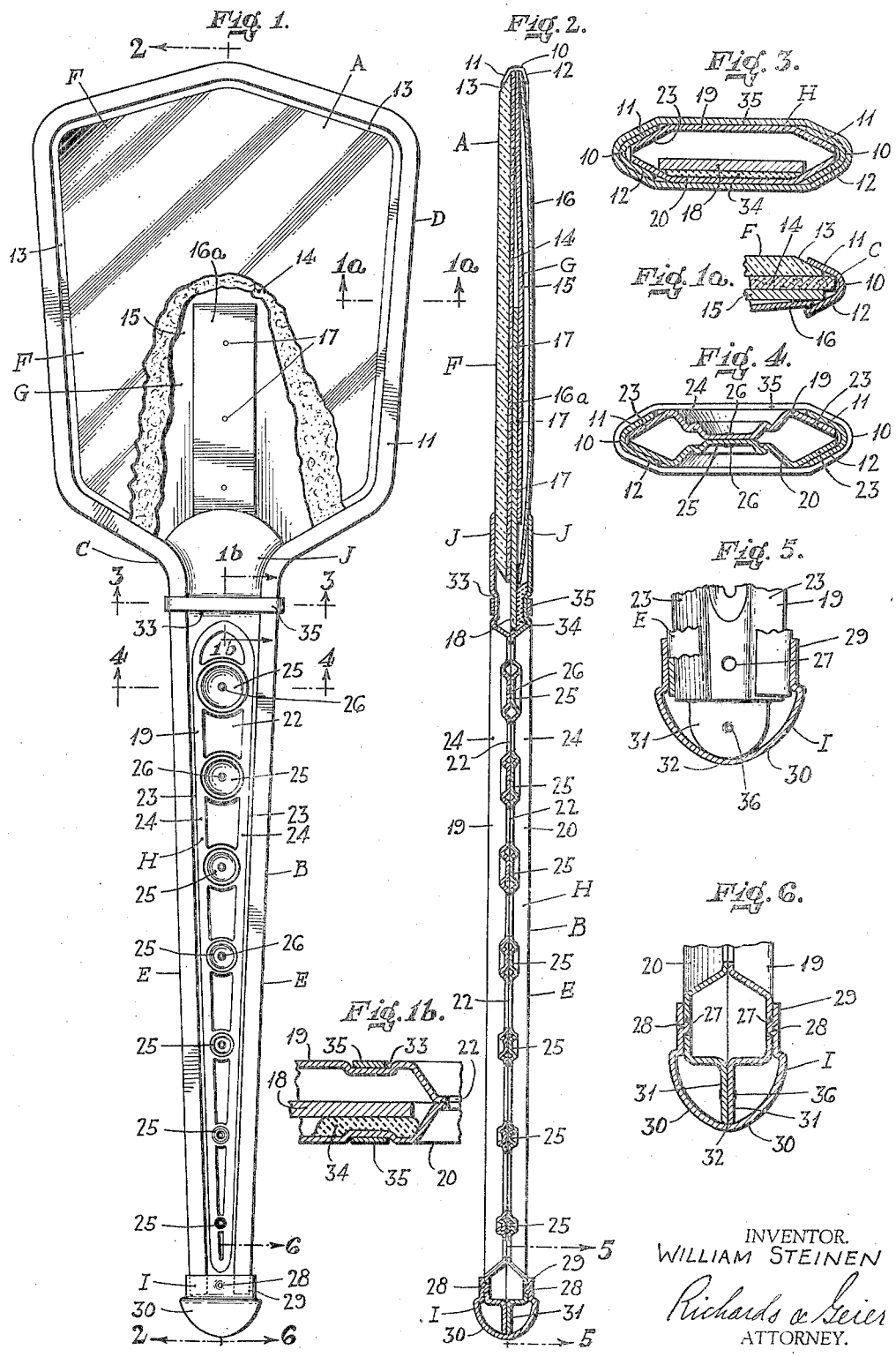
Jan. 7, 1941. W. STEINEN 2,227,558
FRAME AND HANDLE CONSTRUCTION FOR MIRRORS, BRUSHES, AND SIMILAR UTENSILS
Filed Oct. 21, 1939 — 2 Sheets-Sheet 1
INVENTOR.
WILLIAM STEINEN
Richards & Geier
ATTORNEY.

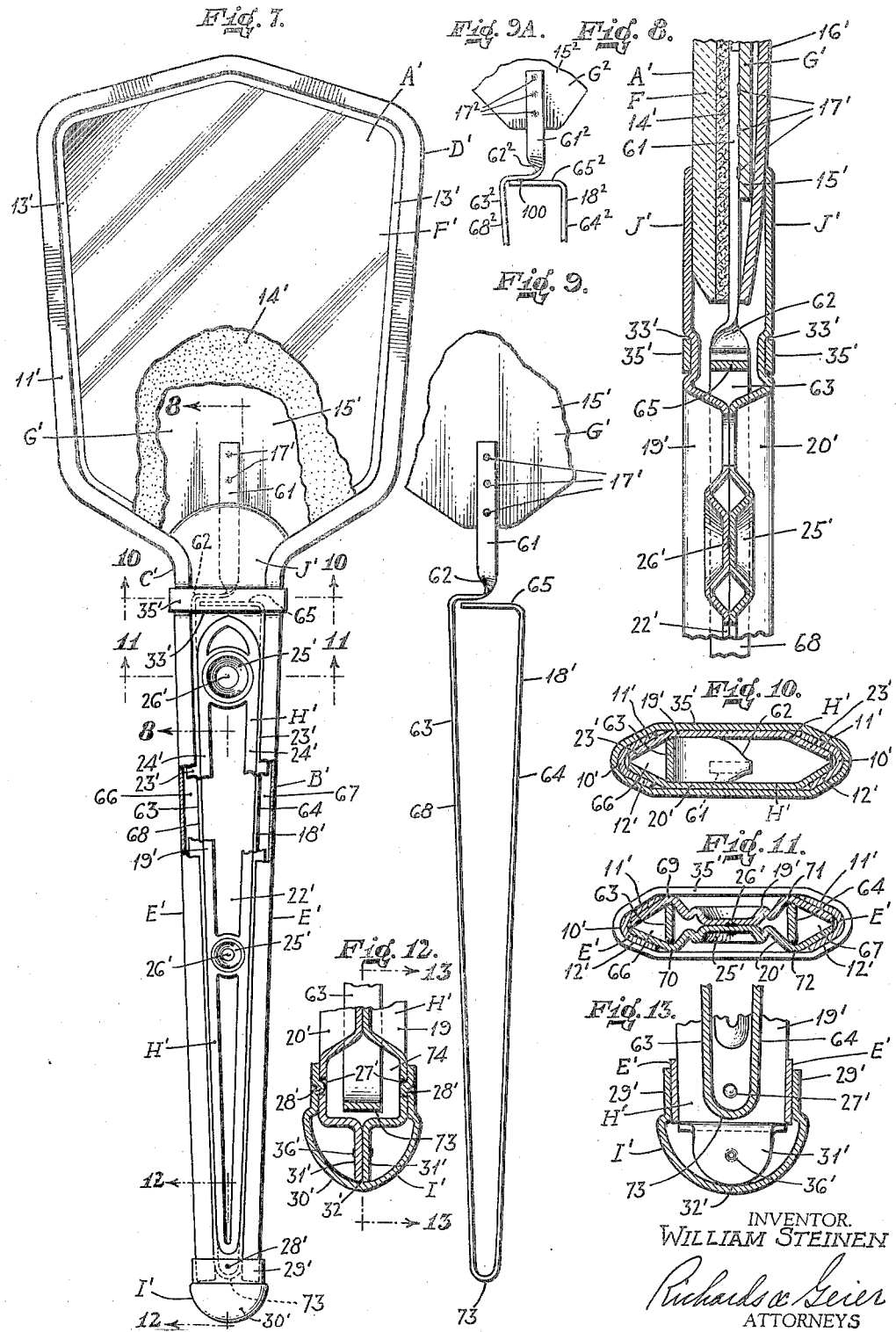

2,227,558

UNITED STATES PATENT OFFICE 2,227,558

FRAME AND HANDLE CONSTRUCTION FOR MIRRORS, BRUSHES, AND SIMILAR UTENSILS

William Steinen, South Orange, N. J.

Application October 21, 1939, Serial No. 300,493

5 Claims. (Cl. 88—102)

The present invention relates to handle and frame constructions for mirrors, brushes and similar articles and particularly relates to such articles which may be utilized in or form part of toilet or dressing room sets.

It is among the objects of the present invention to provide an improved light weight durable frame and handle construction which may be readily applied to mirrors, brushes and other articles useful in toilet or dresser sets, which may be inexpensively and readily manufactured by relatively simple manufacturing operations without the necessity of using screw machine parts, such as bolts, threaded rods, nuts and so forth.

Another object is to provide an improved mirror and brush substantially integrated handle and frame construction, which construction will be rigid and strong and which, in spite of its rugged character will be pleasing in appearance and will be decorative and ornamental.

Still further objects and advantages will appear from the more detailed description set forth below, it being understood, however, that this more detailed description is given by way of illustration since various changes therein may be made by those skilled in the art without departing from the scope and spirit of the invention.

In accomplishing the above objects, it has now been found most suitable to form a continuous channel frame chamber encircling the mirror, brush or other implement and also having extensions forming the sides of the handle construction.

The preferred rim member, which may be made of sheet metal, is desirably of U-shaped or V-shaped cross section and it is desirably designed to enclose backing members for the brush and mirror together with the base of the brush and mirror in a rigid tightened construction.

In back of the mirror or brush may be placed a metal backing plate or backing plate of some other stiff rigid material and the handle structure may be formed of two sheet metal members desirably stamped or formed to give an ornamental appearance which members may be rigidly or integrally connected to each other and to the backing plate and at the same time encircled and clamped at their sides by the extensions of the continuous channel rim frame member.

In the preferred construction, the backing plate is provided with an extension which may be soldered or spot welded thereto where the backing plate is of metal, which extension at the same time, may be spot welded or soldered to one of the handle plate members, the other plate member being soldered or otherwise rigidly connected to the first mentioned handle plate member.

The metal of the continuous channel is preferably made so resilient that it may be drawn up tightly to embrace and enclose the mirror or brush and handle assemblies and in the preferred form, a band is provided which may be slipped along the outside of the extensions forming sides of the handle to adjacent the throat where it may be snapped into position to lock the entire assemblage rigidly in position.

The frame portion of the continuous edging strip or channel rim member may be of any suitable polygonal, oval or circular contour to receive the flat mirror or back of a brush and the conformingly shaped backing plate or frame.

Although less desired, the channel frame member may also be split both at the top of the frame and end of the handle and may be drawn together by suitable clips or fastening means at these points.

The handle is relatively narrower than the frame and it may have straight or converging sides terminating in an end cap.

The invention is particularly directed to an assembly or frame and handle construction in which it will be possible to eliminate the usual type of flaring throat sleeves which not only are difficult to assemble with many types of mirror handles, but also increase the cost of manufacture and weight of the assemblage.

It is among the further objects of the present invention to provide an improved mirror or brush handle or frame assembly which will eliminate the necessity of utilizing flared throat sleeves and which, at the same time, will be strong and durable and will not tend to break at the throat, when the assembly is completed.

Referring to the drawings which illustrate several of the various possible embodiments of the present invention, but to which the present invention is by no means restricted since the drawings are merely by way of illustration and not by way of limitation.

Figure 1 is a front elevational view partly broken away to show the backing plate of the frame and handle assembly of the present invention as applied to a mirror.

Figure 1a is a fragmentary transverse sectional view upon the lines 1a—1a of Figure 1, upon an enlarged scale as compared to Figure 1.

Figure 1b is a fragmentary transverse sectional view upon the lines 1b—1b of Figure 1, upon an enlarged scale as compared to Figure 1.

Figure 2 is a transverse sectional view upon the lines 2—2 of Figure 1.

Figures 3 and 4 are respectively fragmentary transverse sectional views upon the lines 3—3 and 4—4 of Figure 1 upon enlarged scale as compared to Figure 1.

Figures 5 and 6 are respectively transverse sectional views of the lower end of the handle at right angles to each other upon enlarged scale as compared to Figures 1 and 2 upon the lines 5—5 and 6—6 of Figures 2 and 1 respectively.

Figures 7 to 13 show an alternative embodiment, Figure 7 being similar to Figure 1 and being a front elevational view partly broken away to show the throat and handle construction; Figure 8 is a fragmentary transverse sectional view upon the line 8—8 through the throat of the device upon enlarged scale as compared to Figure 7; Figure 9 is an elevational view showing a part of the backing plate and the handle insert element as utilized in the assembly of Figure 7; Figure 9A is a detailed view similar to the upper portion of Figure 9, showing a slight modification of Figure 9; Figures 10 and 11 are transverse sectional views upon the lines 10—10 and 11—11 of Figure 7 upon enlarged scale as compared to Figure 7, and Figures 12 and 13 are respectively fragmentary transverse sectional views of the end of the handle upon enlarged scale upon the lines 12—12 and 13—13 of Figures 7 and 12.

In the construction as shown, the mirror is provided with a frame assembly A and a handle assembly B with a connecting throat J. The assembly is enclosed primarily by the channel rim frame C having a frame portion D and handle portions E.

The frame portion D encloses the mirror F and the backing plate G. The handle extensions E enclose the handle plate constructions H. The end of the handle is provided with the cap I.

As is best shown in Figures 1a and 2, the encircling member C is formed of sheet metal and has a U or V-shaped contour with the bottom 10 and the side flanges 11 and 12. The resilient side flange 11 abuts the bevelled edge 13 of the mirror F and extends entirely around the said mirror up to the throat J.

In back of the mirror is provided a cardboard 14, the sheet metal plate 15 and the ornamental backing 16, all of which have a shape conforming to the shape of the edge of the mirror.

To the lower edge of the plate may be attached a metal strip or bar 16a by the spot welding 17, said bar having a lower end portion 18 extending down into the throat J and into the upper end of the handle structure B.

The handle B is formed of two plates 19 and 20 constituting the handle construction H, which are pierced, as indicated at 22, and are provided with sloping or bevelled edge portions 23, 24 and with contacting circular portions 25 between the piercings 22 to give an ornamental effect, as indicated.

As best shown in Figures 3 and 4, the inclined side portions 23 of the handle are tightly gripped and clamped between the front flanges 11 and back flanges 12 of the extensions E of the encircling frame or rim channel member C.

The circular portions 25 may be welded together as best indicated at 26 in Figure 4.

At the lower edge of the plates 19 and 20, there is provided a recess 27 which may receive the indentations 28 of the lower cap member I in said cap, the reduced diameter portion 29 of the cap has a cupped bottom portion 30.

It will be noted, by reference to Figures 2 and 6 that the ends of the plates 19 and 20 have two inturned abutting portions which at their lower end 32 contact the bottom of the cup 30.

The upper portions of the plates 19 and 20 are provided with indentations 33 to one of which indentations, the lower end of the strip 16a is soldered or welded, as indicated at 34. The locking band 35 may be slid up on the sides of the handle B over the rim C into position to snap into the depression 33 to lock the entire assemblage before the cap I is applied.

In assembly, the devices shown in Figure 1, the mirror F, the cardboard backing 14, the metal plate 15 of the ornamental backing 16 may all be placed inside of the frame portion D of the channel C, which has been previously formed in the pentagon design, as shown in Figure 1.

Before this assembly, the backing plate G may have been soldered, as indicated at 17 to the metal strip 16a, which may have been soldered, as indicated at 34 to the handle plates 19 and 20, which may have been soldered together, as indicated at 26 in Figure 4, and 36 in Figure 6.

After the mirror has been placed in position, the handle extension portions E of the channel rim frame C are placed alongside of said plates 19 and 20 to grip the bevelled or oblique edges 23 thereof, as best shown in Figures 3 and 4, and then the sleeve 35 is slid in position until it snaps into the recess 33 at the top of the handle plates 19 and 20 adjacent the throat J.

Then, the cap I is fitted on to the lower ends of the handle plates 19 and 20 and the extensions of the channel rim E, until the indentations 28 snap into the holes 27 to give the final locked assemblage.

The construction which is finally formed is rigid, durable, artistic and in addition is more decorative, of lighter weight and simpler construction.

The device will not tend to bend at the throat and it will be even more rugged and durable than the standard construction employing the throat sleeve.

The device may be readily manufactured at cheap cost from sheet metal parts which are readily available upon the market.

In respect to the construction of Figures 7 to 13, similarly functioning parts are indicated by the same numerals as in Figures 1 to 6, however, primed.

The backing plate 15' carries a handle extension member 18' which is spot welded as indicated at 17' at the upper portion 61 thereof.

The handle extension 18' consists of a strip of metal which is bent at a right angle at 62 and then at the legs 63 and 64 and the inturned portion 65 to fit inside of the openings 66 and 67 in the sides of the handle plates H', the edges 68 fitting into the inside concavity formed by the peaks 69, 70, 71 and 72 of the handle structure H'.

The bent portion of the extension 73 extends through the opening 74 at the lower end of the plates H' in the manner best shown in Figure 12.

By use of this alternative construction, as shown in Figures 7 to 13, the soldering 34 of Figure 1b, is eliminated and the resiliency of the extension 18' will give a more durable construction with a stronger throat G' which will resist bending at the throat and also assure a permanent assembly which will not readily become loose.

Preferably, the two handle plates H' are placed upon the extension 18' before the channel rim D' is placed in position and before the band 35' and the end cap I' are placed upon the handle structure B'.

In the embodiment of Figure 9A, the same structure is shown as in Figure 9, except that the leg $65^2$ has been spot welded at 100 to the top of the other leg $63^2$.

Correspondingly functioning parts of Figure 9A are referred to by the same numerals as in Figure 9, provided with a superior "2."

It is apparent the specific illustrations shown above have been given by way of illustration and not by way of limitation and that the structures above described are subject to wide variation and modification without departing from the scope or intent of the invention, all of which variations and modifications are to be included within the scope of the present invention.

What is claimed is:

1. In a mirror, brush or similar construction, a frame and handle assembly to receive a mirror or brush element comprising a split resilient sheet metal channel rim of U-shaped cross section constituting the periphery and outside edges of the frame and handle, a backing member having an enlarged portion of the same shape and outline as the mirror or brush element, an elongated handle portion, said backing member and said handle portion clamped at their peripheries in the bottom of the U-shaped recess of said channel member and between the flanges of the U of said channel member, said channel member having frame portions embracing said mirror or brush element and substantially parallel handle portions extending along the handle from the base of the frame and forming the exterior sides of said handle and a metal band to draw up said channel handle and frame portions upon said backing member and mirror or brush element, said handle including facing plates positioned in said handle on each side of said elongated handle portion and embossments upon said facing plates adjacent the top of the handle between which said metal band is resiliently mounted in position, said facing plates being perforated and spot welded together.

2. In a mirror, brush or similar construction, a frame and handle assembly to receive a mirror or brush element comprising a split resilient sheet metal channel rim of U-shaped cross section constituting the periphery and outside edges of the frame and handle, a backing member having an enlarged portion of the same shape and outline as the mirror or brush element, an elongated handle portion, said backing member and said handle portion clamped at their peripheries in the bottom of the U-shaped recess of said channel member and between the flanges of the U of said channel member, said channel member having frame portions embracing said mirror or brush element and substantially parallel handle portions extending along the handle from the base of the frame and forming the exterior sides of said handle and means drawing up said channel handle and frame portions upon said backing member and mirror or brush element, said means including a tightening metal band slidably mounted upon the outside of said handle at its junction with the frame, said handle including facing plates positioned in said handle on each side of said elongated handle portion, said facing plates having bosses locking said band in position and said plates being welded together.

3. In a mirror, brush or similar construction, a frame and handle assembly to receive a mirror or brush element comprising a split resilient sheet metal channel rim of U-shaped cross section constituting the periphery and outside edges of the frame and handle, a backing member having an enlarged portion of the same shape and outline as the mirror or brush element, an elongated handle portion, said backing member and said handle portion clamped at their peripheries in the bottom of the U-shaped recess of said channel member and between the flanges of the U of said channel member, said channel member having frame portions embracing said mirror or brush element and substantially parallel handle portions extending along the handle from the base of the frame and forming the exterior sides of said handle and means to draw up said channel, handle and frame portions upon said backing member and mirror or brush element, said means including a tightening metal band slidably mounted upon the outside of said handle at its junction with the frame and embossments upon said handle structure between which said metal band is resiliently mounted in position, said backing member having a resilient extension into the handle extending entirely around the periphery of said handle.

4. In a mirror, brush or similar construction, a frame and handle assembly to receive a mirror or brush element comprising a split resilient sheet metal channel rim of U-shaped cross section constituting the periphery and outside edges of the frame and handle, a backing member having an enlarged portion of the same shape and outline as the mirror or brush element, an elongated handle portion, said backing member and said handle portion clamped at their peripheries in the bottom of the U-shaped recess of said channel member and between the flanges of the U of said channel member, said channel member having frame portions embracing said mirror or brush element and substantially parallel handle portions extending along the handle from the base of the frame and forming the exterior sides of said handle and means to draw up said channel handle and frame portions upon said backing member and mirror or brush element, said means including a tightening metal band slidably mounted upon the outside of said handle at its junction with the frame and embossments upon said handle structure between which said metal band is resiliently mounted in position, said backing member having a U-shaped extension extending into said handle, said handle having a peripheral groove receiving said extension.

5. In a mirror, brush or similar construction, a frame and handle assembly to receive a mirror or brush element comprising a split resilient sheet metal channel rim of U-shaped cross section constituting the periphery and outside edges of the frame and handle, a backing member having an enlarged portion of the same shape and outline as the mirror or brush element, an elongated handle portion, said backing member and said handle portion clamped at their peripheries in the bottom of the U-shaped recess of said channel member and between the flanges of the U of said channel member, said channel member having frame portions embracing said mirror or brush element and substantially parallel handle portions extending along the handle from the base of the frame and forming the exterior sides of said handle and means to draw up said channel handle and frame portions upon said backing member and mirror or brush element, said means including a tightening metal band slidably mounted upon the outside of said handle at its junction with the frame and embossments upon said handle structure between which said metal band is resiliently mounted in position, said backing member having a rod like extension which is bent to the formation of the handle, said handle having a peripheral recess to receive said extension.

WILLIAM STEINEN.